(12) United States Patent
Taylor et al.

(10) Patent No.: US 10,465,430 B2
(45) Date of Patent: Nov. 5, 2019

(54) DRIVE DEVICE FOR A VEHICLE DOOR

(71) Applicant: Brose Fahrzeugteile GmbH & Co. Kommanditgesellschaft, Bamberg, Bamberg (DE)

(72) Inventors: Kim Taylor, Farmington Hills, MI (US); Olaf Kriese, Coburg (DE)

(73) Assignee: Brose Fahrzeugteile GMBH & Co. Kommanditgesellschaft, Bamberg, Bamberg (DE)

( * ) Notice: Subject to any disclaimer, the term of this patent is extended or adjusted under 35 U.S.C. 154(b) by 190 days.

(21) Appl. No.: 15/655,748

(22) Filed: Jul. 20, 2017

(65) Prior Publication Data

US 2019/0024433 A1 Jan. 24, 2019

(51) Int. Cl.
| | | |
|---|---|---|
| *E05F 11/00* | (2006.01) | |
| *E05F 15/643* | (2015.01) | |
| *E05F 15/627* | (2015.01) | |
| *E05F 15/63* | (2015.01) | |
| *B60J 5/06* | (2006.01) | |

(52) U.S. Cl.
CPC .......... *E05F 15/643* (2015.01); *E05F 15/627* (2015.01); *E05F 15/63* (2015.01); *B60J 5/06* (2013.01); *E05Y 2201/21* (2013.01); *E05Y 2201/218* (2013.01); *E05Y 2201/246* (2013.01); *E05Y 2201/43* (2013.01); *E05Y 2201/654* (2013.01); *E05Y 2201/662* (2013.01);
(Continued)

(58) Field of Classification Search
CPC ..... E05F 15/643; E05F 15/686; B60J 5/0416; B60J 5/00; B60J 5/044; E05D 2900/531; E05D 2201/654; E05D 2800/113; E05D 2900/00; E05D 2201/246

USPC .......... 49/324, 394, 381, 311, 332, 334, 340
See application file for complete search history.

(56) References Cited

U.S. PATENT DOCUMENTS 2,086,025 A * 7/1937 Gano, Jr. ................ E05F 15/47
296/146.4
4,109,417 A * 8/1978 Fogarollo ............. E05F 11/486
49/352
(Continued)

FOREIGN PATENT DOCUMENTS

| DE | 10225756 A1 | 1/2004 |
|---|---|---|
| DE | 10245458 A1 | 4/2004 |

(Continued)

OTHER PUBLICATIONS

UK Combined Search and Examination Report issued in corresponding UK Application No. GB1713467.7 dated Feb. 20, 2018, 6 pages.

*Primary Examiner* — Chi Q Nguyen
(74) *Attorney, Agent, or Firm* — Lewis Roca Rothgerber Christie LLP

(57) ABSTRACT

A device for a motor-driven adjustment of a vehicle door, in particular comprising a traction mechanism configured to be mounted to a vehicle door and comprising a motor drive unit and at least one flexible traction member, the at least one flexible traction member being connected to a check arm to be fastened to a vehicle body structure and the motor drive unit, and the motor drive unit being configured to drive the at least one flexible traction member for pulling the check arm, by the at least one flexible traction member, along an adjustment path for adjusting the vehicle door relative to the body structure.

19 Claims, 11 Drawing Sheets

(52) U.S. Cl.
CPC ..... *E05Y 2800/113* (2013.01); *E05Y 2800/75* (2013.01); *E05Y 2900/531* (2013.01)

(56) References Cited

U.S. PATENT DOCUMENTS

| | | | | |
|---|---|---|---|---|
| 4,168,595 | A * | 9/1979 | Pickles | E05F 11/426 |
| | | | | 49/352 |
| 4,663,886 | A * | 5/1987 | Nakamura | B60J 1/17 |
| | | | | 49/352 |
| 5,333,411 | A * | 8/1994 | Tschirschwitz | E05F 11/486 |
| | | | | 49/352 |
| 6,185,868 | B1 | 2/2001 | Kato | |
| 7,290,823 | B2 * | 11/2007 | Kleinmann | E05F 15/619 |
| | | | | 296/146.8 |
| 7,424,788 | B2 * | 9/2008 | Kirejczyk | E05F 11/483 |
| | | | | 49/352 |
| 7,631,458 | B2 * | 12/2009 | Moriyama | E05F 15/689 |
| | | | | 49/349 |
| 7,882,658 | B2 * | 2/2011 | Staser | B60J 5/0416 |
| | | | | 49/352 |
| 8,402,695 | B2 * | 3/2013 | Smith | H01R 35/02 |
| | | | | 49/332 |
| 2004/0074148 | A1 * | 4/2004 | Her | E05B 83/40 |
| | | | | 49/324 |
| 2004/0159170 | A1 | 8/2004 | Ritter | |
| 2004/0195419 | A1 * | 10/2004 | Yamagishi | E05F 15/646 |
| | | | | 242/365.6 |
| 2006/0151231 | A1 | 7/2006 | Bucksch et al. | |
| 2006/0156631 | A1 * | 7/2006 | Koelle | B60J 5/0416 |
| | | | | 49/394 |

FOREIGN PATENT DOCUMENTS

| | | |
|---|---|---|
| DE | 102012015650 A1 | 2/2014 |
| JP | 2003041853 A | 2/2003 |
| JP | 2008291605 A | 12/2008 |
| WO | WO2014/023433 A1 | 2/2014 |
| WO | WO 2017/029262 A1 | 2/2017 |
| WO | WO 2017/147156 A1 | 8/2017 |

* cited by examiner

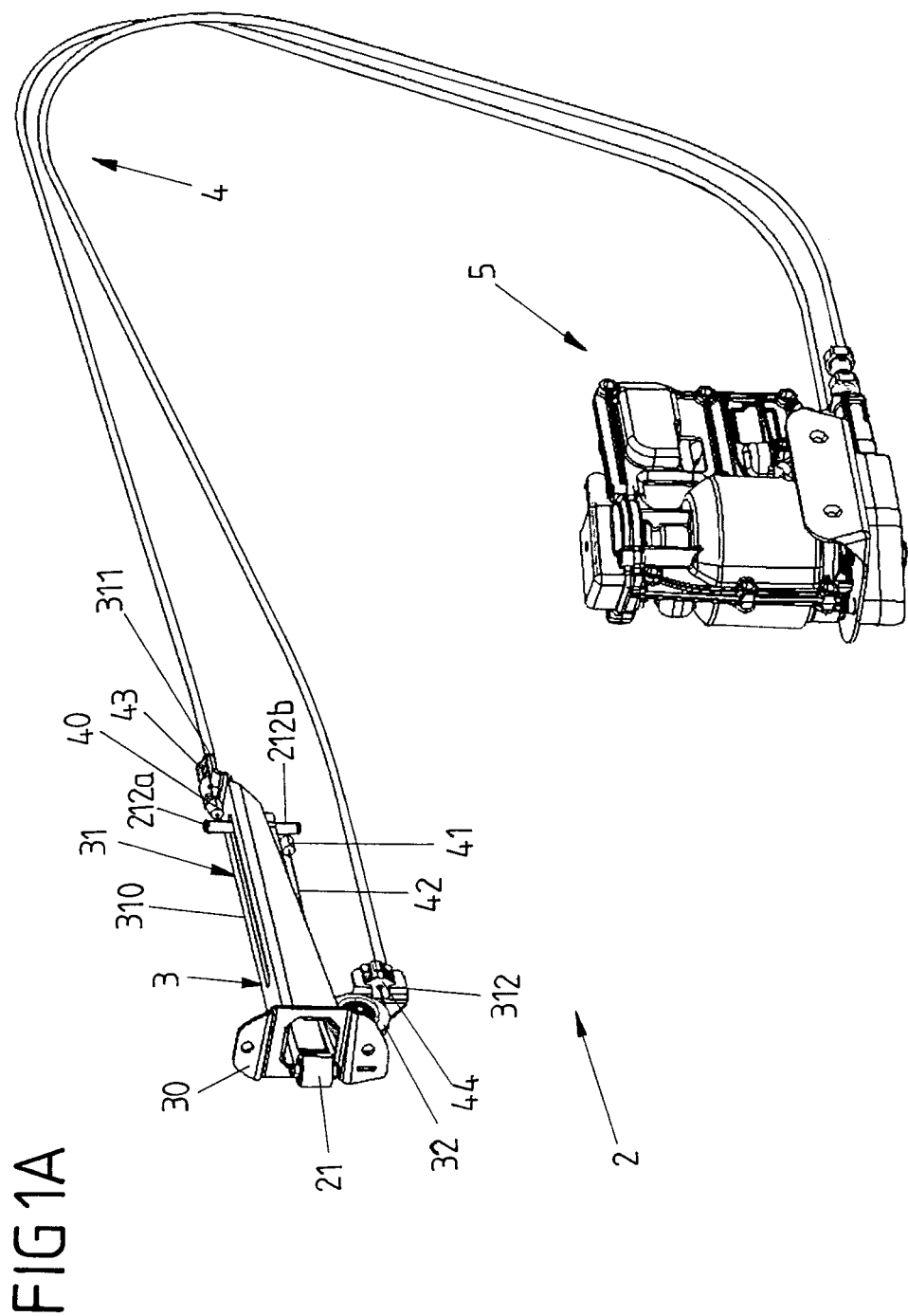

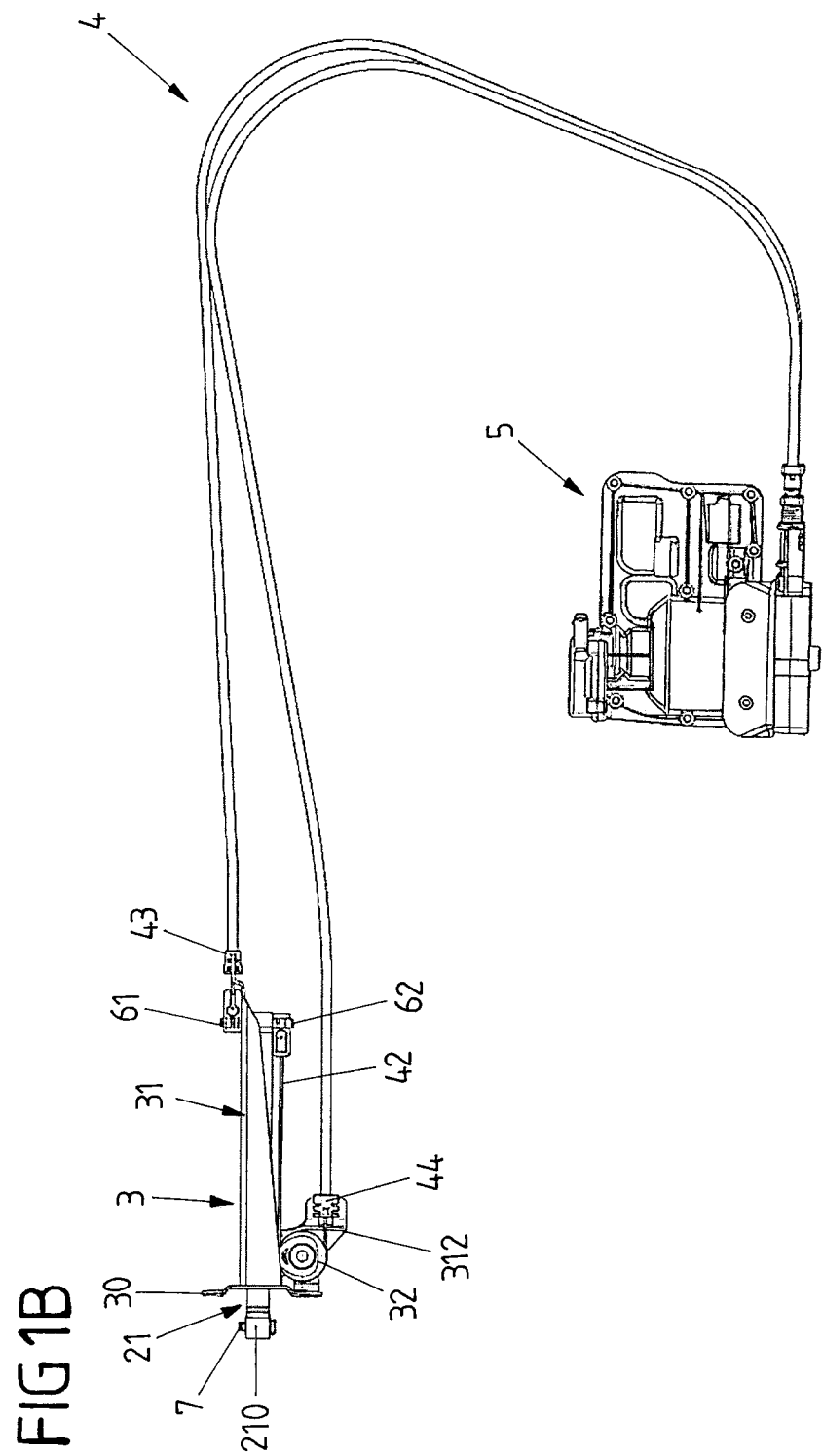

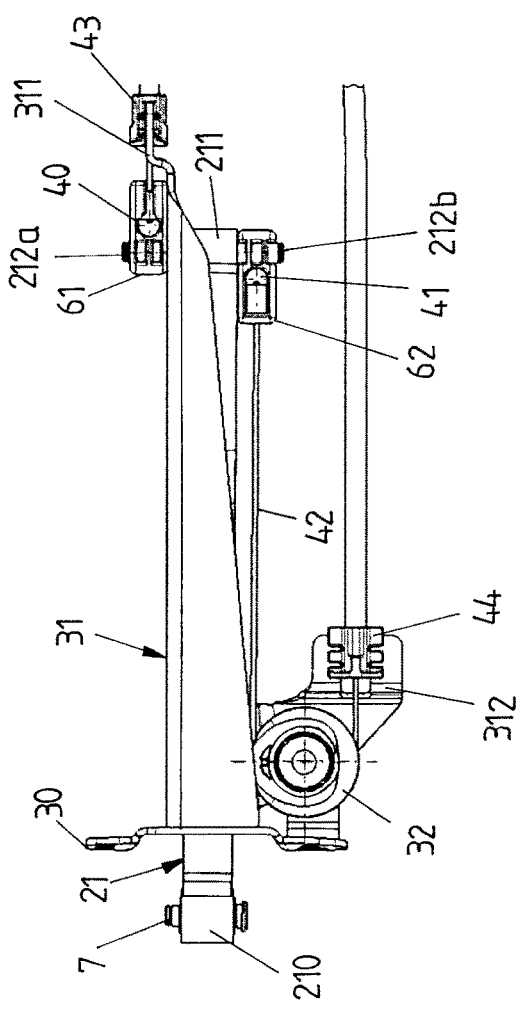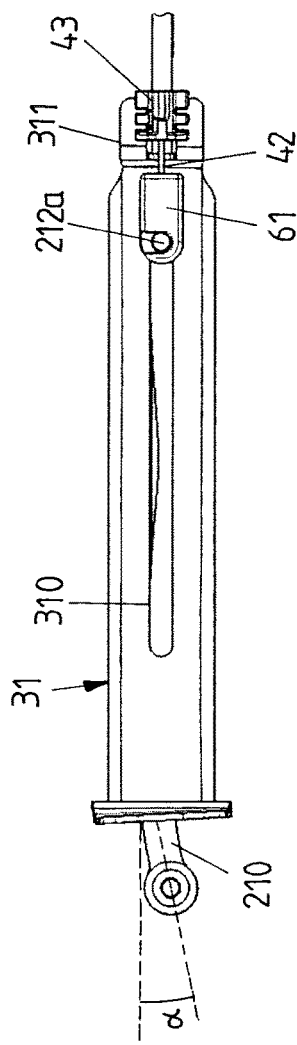

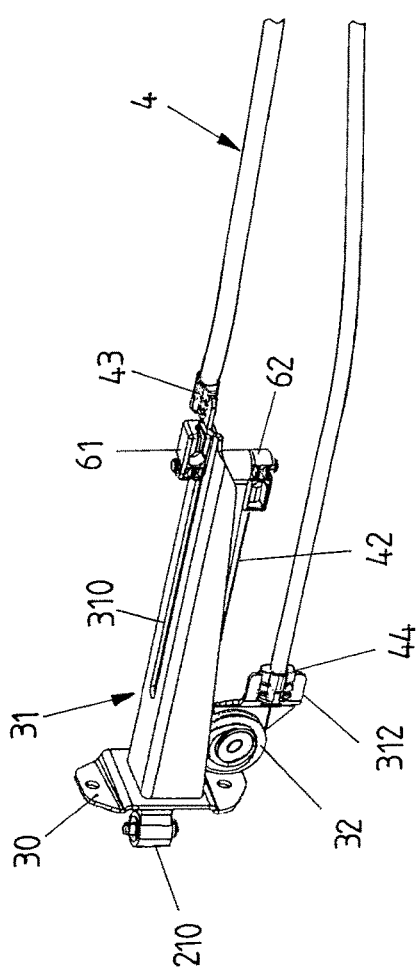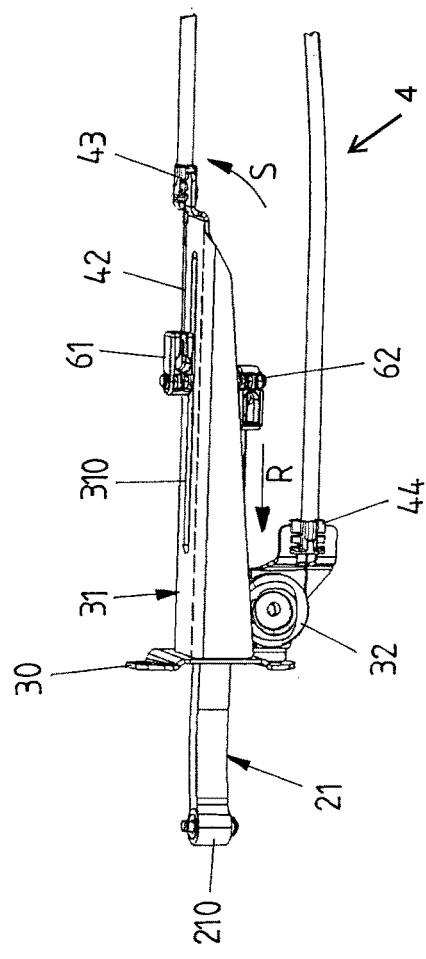

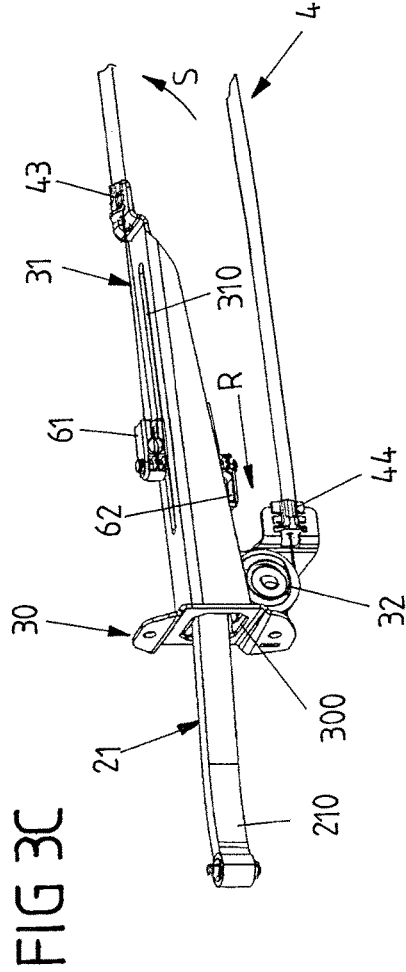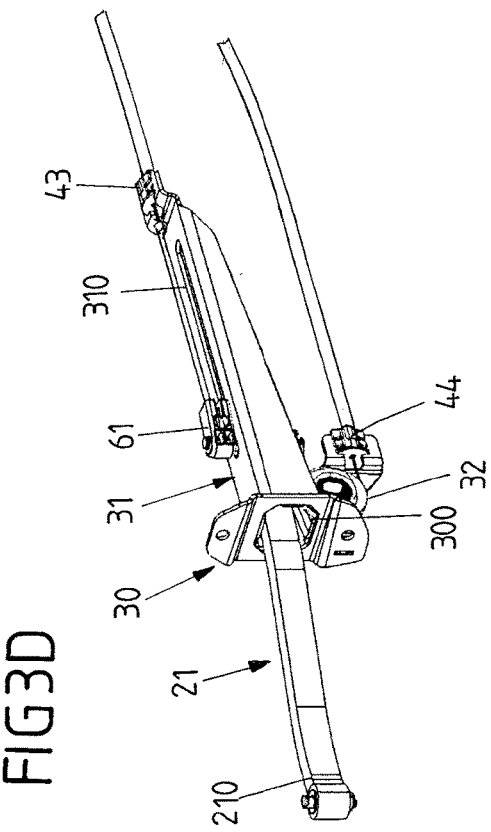

DRIVE DEVICE FOR A VEHICLE DOOR

FIELD

The present invention relates to a device for a motor-driven adjustment of a vehicle door.

BACKGROUND

Devices for a motor-driven adjustment of a vehicle door are already well-known. Typically, an electric motor is used to power an adjustment mechanism of a device to open and close are hinged vehicle door relative to a body structure of the vehicle so that a user may displace the vehicle door without pulling or pushing it. So far, different devices for a motor-driven adjustment of a vehicle door have been proposed. Such devices are usually rather complex and nee lots of space in an interior of the vehicle door and/or at the body structure of the vehicle. Addressing these difficulties WO 2017/029062 A1, for example, proposes to use an adjustment mechanism including a traction mechanism with a flexible traction member in the form of a rope for providing a device by means of which a vehicle door may be adjusted both manually and by means of a motor drive unit of the device. In this device the rope is connected with both ends to an elongated check arm of the device. An adjustment force may be applied by cable drum to which a part of the rope is wound. There is a need for a differently designed device for a motor-driven adjustment of vehicle door, in particular for a device with a smaller package size.

SUMMARY

A device for a motor-driven adjustment of a vehicle door is proposed, the device comprising at least the following:
- a bracket configured to be fastened to the vehicle door, the bracket comprising a guiding element;
- a check arm configured to be fastened to a body structure of a vehicle at which the vehicle door is adjustably mounted, e.g., hinged, the check arm being movable relative to the bracket and being guided at the guiding element along an adjustment path; and
- an traction mechanism configured to be mounted to the vehicle door and comprising a motor drive unit and at least one flexible traction member, the at least one flexible traction member being connected to the check arm and the motor drive unit, and the motor drive unit being configured to drive the at least one flexible traction member for pulling the check arm, by the at least one flexible traction member, along the adjustment path for adjusting the vehicle door relative to the body structure.

The motor drive unit is thus configured to exert a driving force on the traction member due to which the check arm is pulled along the adjustment path for adjusting the vehicle door relative to the vehicle's body structure when the device is duly mounted to the vehicle.

In one embodiment the guiding element comprises a guiding slot defining the adjustment path for the check arm. The guiding slot of the bracket's guiding element may provide for a side support along the adjustment path when the vehicle door opens or closes and thus the check arm is moved relative to the bracket of the device.

In one embodiment the bracket comprises a channel for at least partially accommodating the check arm. The check arm may thus slide in the channel and be at least partially accommodated therein. In a vehicle equipped with the device the check arm may for example be accommodated with a substantial part of its length in the channel of the bracket when the vehicle door is fully closed. In an fully open position of the vehicle door are significantly smaller part of the check arm is accommodated in the channel given that the check arm is fastened to the body structure and the door (with the bracket) has been adjusted relative to the body structure.

In one embodiment the check arm comprises at least one connection element. Such a connection element may be for example provided for engaging into a guiding slot of the guiding element by means of which the adjustment path for the check arm is defined. In one embodiment the connection element reaches through the guiding slot so that a first portion of the connection element projects from a first side of the guiding element and a second portion of the connection element projects from a second side of the guiding element, the first and second sides being connected by the guiding slot and facing away from each other. For example, in a mounted state of the device, the first portion of the connection element extends from an upper side of the guiding element, whereas the second portion of the connection element extends from a lower side of the guiding element.

In one embodiment in which the check arm comprises at least one connection element the at least one connection element may connect the at least one flexible traction member to the check arm. A connection provided by the connection element between the at least one flexible traction member and the check arm allows for exerting a pulling force on the check arm for pulling the check arm along the adjustment path when the at least one flexible traction member is driven by the motor drive unit. In addition, the at least one connection element may also comprise a first portion connected to the check arm and a second portion connected to the at least one flexible traction member. The first portion of the connection element being connected to the check arm includes an embodiment in which the first portion and thus the connection element is integrally formed with the check arm as well as an embodiment in which the connection element is a separate component fixed to the check arm at its first portion, e.g., by welding or by a press-fit.

In one embodiment the at least one flexible traction member comprises at least one fastening element for connecting the at least one flexible traction member to the check arm. The at least one fastening member for example comprises a hook-shaped fastening portion connecting the at least one flexible traction member (e.g., via a connection element of the check arm) to the check arm. The hook-shaped fastening portion of the fastening element may for example be clipped or hinged to a pin-like (first) portion of a connection element of the check arm for connecting the at least one flexible traction member with the check arm so that pulling force may be exerted by the flexible traction member to the check arm.

In one embodiment the at least one flexible traction member comprises a rope, cable or wire, for example as a part of a Bowden cable. Such Bowden cable typically comprises a core wire slidably mounted in a Bowden sleeve. In one embodiment a core wire of a Bowden cable is attached to a fastening member of the at least one flexible traction member which connects the at least one flexible traction member to the check arm. The fastening member in the this embodiment may thus comprise a portion or region to which the core wire is attached as well as a portion or region for a connection with the check arm, e.g., for a connection with a connection element of the check arm. For example the fastening member comprises a mounting receptacle for holding a core wire end body of the core wire in a positive fitting manner. Additionally or in the alternative, the fastening member comprises a hook-shaped fastening portion connecting the at least one flexible traction member to the check arm as stated above.

In one embodiment the at least one flexible traction member comprises at least one support element abutting on the bracket. For a defined abutment the bracket may comprise at least one supporting region for the at least one support element of the at least one flexible traction member. In this regard, at least one support element may be provided which is connected to the at least one supporting region by a positive connection. In one embodiment the at least one supporting region of the bracket comprises at least one stud engaging into a slot on the at least one support element thereby forming the positive connection. By the stud on the supporting region engaging into a slot of the at least one support element the support element is held at the bracket in a defined position. Hence, it may be ensured that the flexible traction member, including a core wire of a Bowden cable, is properly supported at the bracket and runs at the bracket as intended.

In one embodiment the at least one flexible traction member comprises two support elements and the bracket comprises two supporting regions, wherein each support element is associated with one of the two support regions at the bracket. Each support element may be associated with one of two ends of the at least one flexible traction member. By means of the two support elements the traction member may be supported at two defined positions at the bracket spaced apart from each other. For example, our first support element may be associated with a first end of the at least one flexible traction member for pulling the check arm (and thus the vehicle door) to an open position whereas a second support element may be associated with a second end of the at least one flexible traction member for pulling the check arm (and thus the vehicle door)—along an opposite direction—to a closed position.

In one embodiment the device comprises at least one deflection element at the bracket for guiding the at least one flexible traction member from a first direction to a different second direction. A deflection element is thus provided at the bracket for changing the direction of the at least one flexible traction member. By the at least one deflection element at the bracket the at least one flexible traction member is for example deflected by more than 90°. The at least one deflection element may guide the at least one flexible traction member from the motor drive unit towards a connection element of the check arm at which the at least one flexible traction member is connected to the check arm. The deflection element can for example comprise an immovable deflection piece or a rotatably mounted pulley. In case the at least one deflection element comprises a pulley which is rotatably mounted to the bracket the bracket may include a pulley supporting region for rotatably mounting the pulley.

In one embodiment the check arm comprises are curved shape. Such a curved shape may follow an adjustment movement of the vehicle door so that an aperture at the vehicle door to interior space of the vehicle door through which the check arm extends can be kept relatively small. The curved shape of the check arm in this context for example follows an opening movement of the vehicle door.

In one embodiment the device further comprises a brake mechanism located at the bracket and being switchable between an unlocked state and a locking state. Locating the brake mechanism at the bracket, e.g., in a separate break unit, allows for functionally separating the driving of the at least one traction member and thus opening and closing movements of the vehicle door from breaking such movement and blocking the vehicle door in a position relative to the body structure of the vehicle. The brake mechanism at the bracket in this regard in particular allows for separating the brake mechanism from the motor drive unit and to thus place the motor drive unit (without a brake mechanism) to a location at the vehicle door distant from the brake mechanism. In one embodiment the brake mechanism is a configured to, in the unlocked state, allow the check arm to be moved relative to the bracket and to, in the locking state, lock a connection element of the check arm, which connects the at least one flexible traction member to the check arm, in a position relative to the bracket so that the check arm is not movable relative to the bracket. Hence, the brake mechanism is configured to hold the connection element of the check in a position relative to the bracket and to thereby maintain a position of the vehicle door relative to the body structure of the vehicle.

The brake mechanism may also be equipped with sensor device for detecting a door movement. Such a sensor device may sense a movement of the door directly at the bracket and may thus measure a movement of the check arm relative to the bracket. Compared to a sensor device located at or near the motor drive unit measuring movement of the at least one traction member a sensor device at the bracket may measure door movements without any effects of play or slack present in the device and in particular in the traction mechanism.

Generally, the brake mechanism may be controlled electrically and/or mechanically.

BRIEF DESCRIPTION OF THE DRAWINGS

The previously mentioned and other advantages of the present solution will be apparent to those skilled in the art upon consideration of the following specification and the attached drawings.

FIGS. 1A to 1B are different views of a first embodiment of a device for a motor-driven adjustment of a vehicle door.

FIGS. 2A to 2F are different views of parts of the device.

FIGS. 3A to 3D are perspective views on parts of the device in a different phases of an adjustment movement of the device for adjusting a vehicle door from a fully closed position to a fully opened position by means of the device.

DETAILED DESCRIPTION

Figure 6:
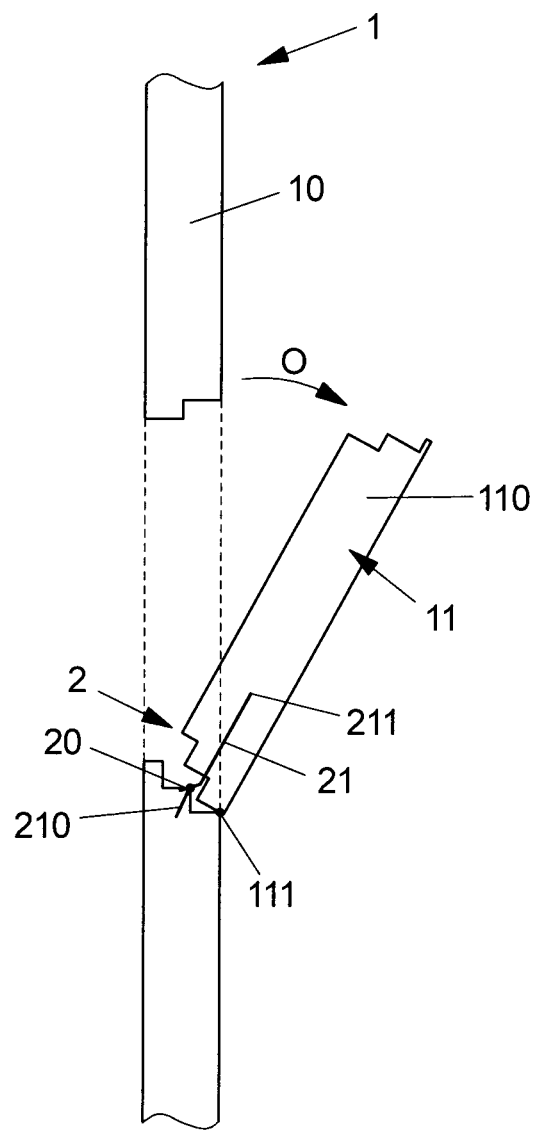
FIG. 6 is a schematic view of the vehicle door and a body structure of a vehicle with the device of which an elongated check arm is hinged to the body structure and a bracket is fastened to the vehicle door.

FIG. 6 shows a schematic view of a vehicle 1 with a body structure 10 and a vehicle door 11 hinged to the body structure 10 by means of a door hinge 111. The vehicle door 11 may be swiveled around a hinge axis provided by the door hinge 111 along an opening direction O relative to the body structure 10 for opening the vehicle door 11 and for closing the vehicle door 11.

A device 2 is provided for allowing for an motor-driven adjustment of the vehicle door 11 relative to the body structure 10. This device 2 at the same time still allows for a manual displacement of the vehicle door 11 relative to the body structure 10. Accordingly, the vehicle door 11 may be adjusted relative to the body structure 10 using the device 2 and thus a motor drive unit 5 included therein (see FIGS. 1A to 1B) but may also be moved manually by pulling or pushing the vehicle door 11. Typically, the device 2 also includes a breaking mechanism for locking the vehicle door 11 relative to the body structure 10 in a partially or fully opened position.

The device 2 in particular includes an elongated check arm 21 which is hinged to the body structure 10 by means of an articulated joint 20, for example at a pillar of the vehicle, like the A-pillar of the vehicle. The check arm 21 extends with one end 211 into a door interior 110 of the vehicle door 11. When the vehicle door 11 is swiveled the check arm 21 moves relative to the vehicle door 11 and moves in the door interior 110. At the other end 210 of the check arm 21 located outside the door interior 110 the check arm 21 is hinged to the body structure 10 by means of the articulated joint 20. The check arm 21 thus extends from one end 210 hinged to the body structure 10 into the door interior 110 of the vehicle door 11 when the device 2 his duly mounted to the vehicle 1.

Figure 2A:
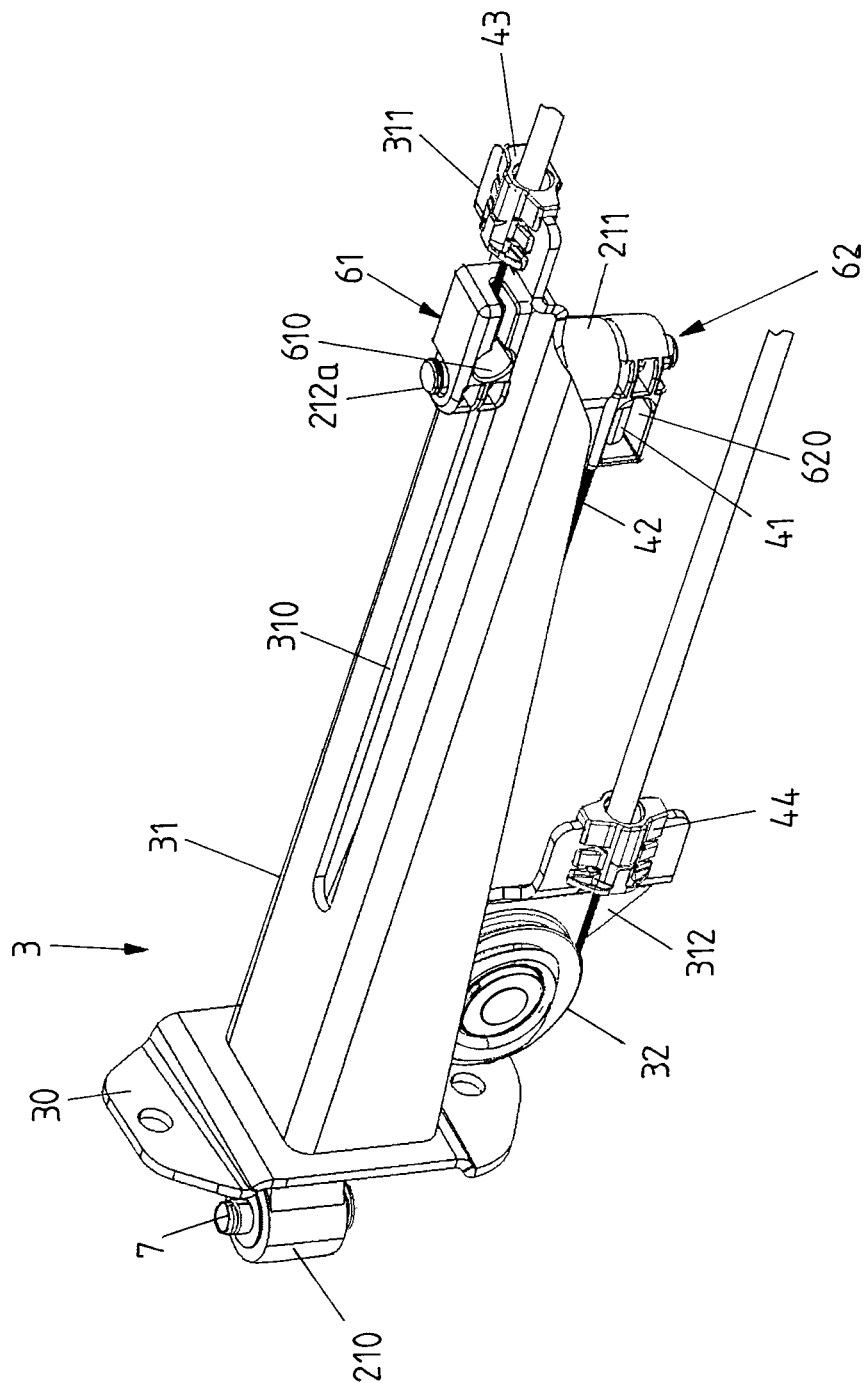
Figure 2B:
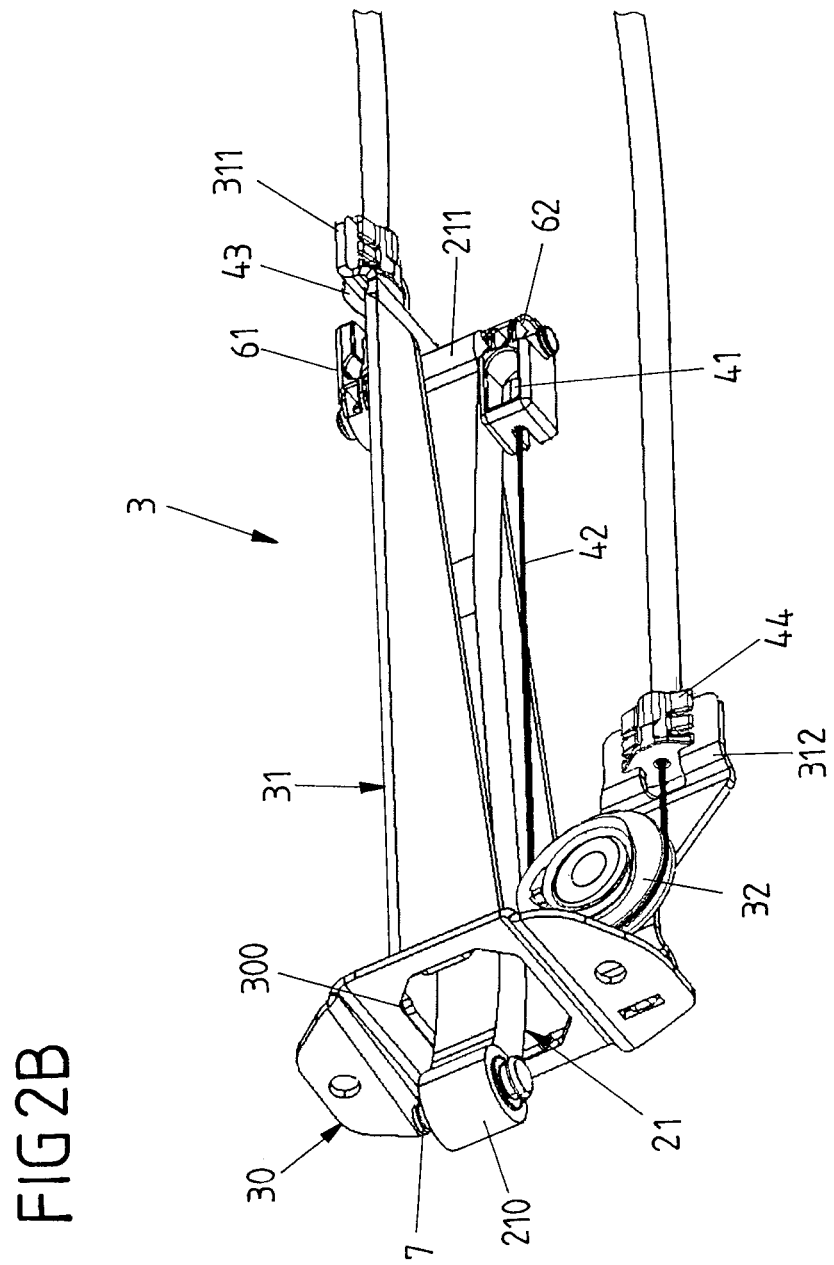
Figure 2E:
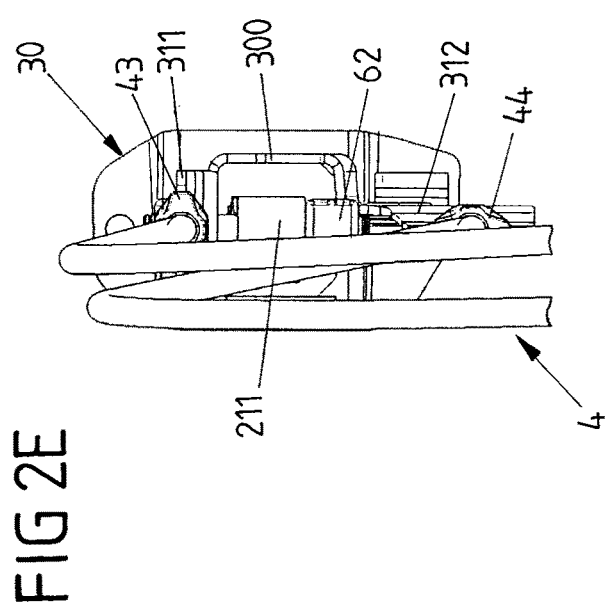
Figure 2F:
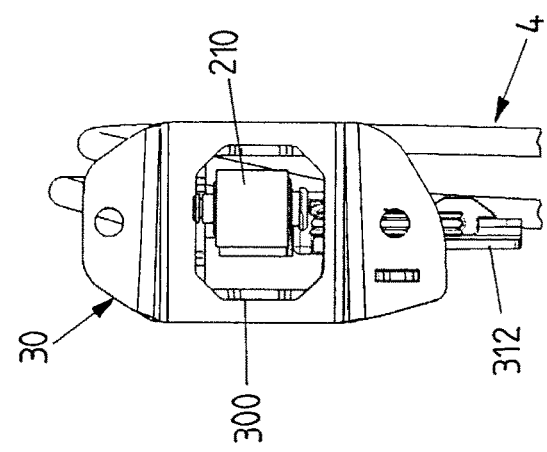

A first embodiment of the device 2 is shown in FIGS. 1A and 2F in more detail. FIGS. 1A to 1B and 2A to 2F show, in different views, the device 2 and its components. The devices 2, in addition to the elevated check arm 21, in particular includes an elongated bracket 3 configured to be fastened to the vehicle door 11. The bracket 3 comprises a guiding element 31 extending into the door interior 110 if the device 2 is duly mounted to the vehicle 1. This guiding element 31 defines a channel 31a in which the check arm 21 is at least partially accommodated and in which the check arm 21 is movable relative to the bracket 3. In a first end position of the device 2 shown in FIGS. 1A to 2F corresponding to a fully closed position of the vehicle door 11 are substantial length of the check arm 21 is accommodated in the channel 31a of the guiding element 31.

An opening to the channel 31a for the check arm 21 is provided at the bracket 3 by our fastening element 30 and its bracket opening 300. For fixing the bracket 3 to the vehicle door 11 the fastening element 30 for example comprises fixing holes for at least one or more fixing screws or bolts. The bracket 3 of the device 2 shown is to be fastened to a lateral side of the vehicle door 11 via the fastening element 30.

For moving the check arm 21 relative to the bracket 3 the device 2 includes a traction mechanism comprising a motor drive unit 5 and a flexible traction member in the form of a Bowden cable 4. The motor drive unit 5 includes an electric drive motor and a cable drum for exerting a driving force on a core wire 42 of the Bowden cable 4 and for pulling the check arm 21 along the bracket 3 in order to displace the vehicle door 11 relative to the door structure 10. By operating the electric drive motor of the motor drive unit 5 a portion of the core wire 42 may wound and unwound at the cable drum thus moving the core wire 42 relative to Bowden sleeves of the Bowden cable 4 in which the core wire is slidably accommodated except for two end portions.

The core wire 42 of the Bowden cable 4 comprises two wire end bodies 40, 41 at the end portions projecting from the Bowden sleeves. Both wire end bodies 40, 41 of the core wire 42 are connected to the check arm 21 at the end 211 of the check arm 21. By each of the wire end bodies 40, 41 a pulling force may applied to the check arm 21 so that the check arm may be pulled via a first wire end body 40 in a first direction relative to the bracket 3 and may be pulled via a second wire end body 41 in an opposite second direction.

Figure 4:
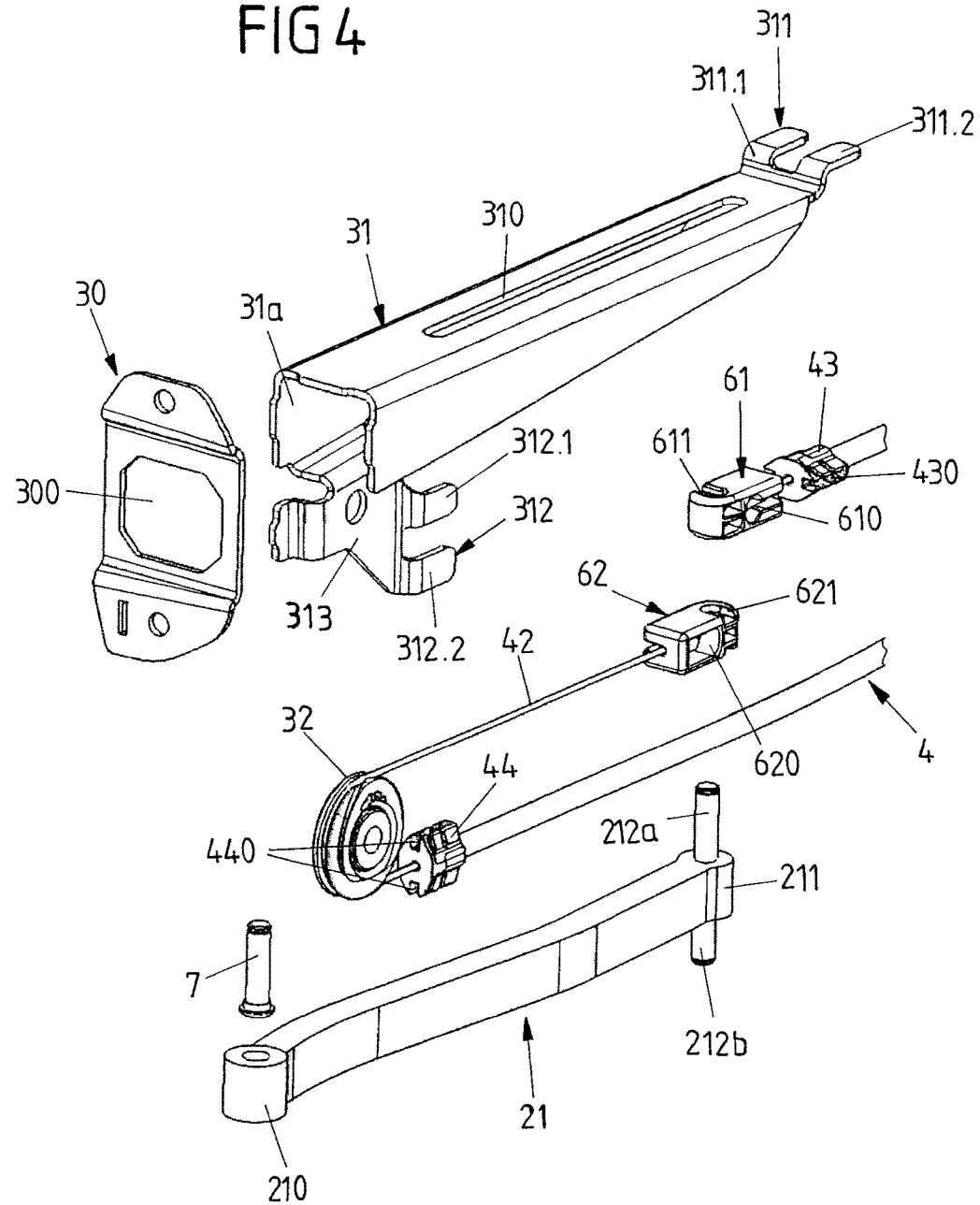
FIG. 4 is an exploded view on parts of the device.

For the core wire 42 being movable in the Bowden sleeves of the Bowden cable 4, each Bowden sleeve is supported with one end at the motor drive unit 5 and with its other end at the bracket 3. For support at the bracket 3, each Bowden sleeve comprises a support member 43, 44 in the form of an elongated plug. Each support member 43, 44 is associated with one end of the core wire 42 and is provided at a respective end of a Bowden sleeve. Each support member 43, 44 is fixed at an end of a Bowden sleeve and abuts on a supporting region 311 or 312 of the bracket 3. As can also be seen from the exploded view of FIG. 4 each supporting region 311, 312 comprises two parallel supporting studs 311.1, 311.2 and 312.1, 312.2. The supporting studs 311.1, 311.2 and 312.1, 312.2 of a supporting region 311, 312 respectively define a clearance between them into which a support element 43, 44 may be plugged. Each support element 43, 44 comprises two lateral, elongated engagement slots 430, 440. Each stud 311.1, 311.2 and 312.1, 312.2 of a pair of studs of a supporting region 311, 312 respectably engages into one of this engagement slots 430, 440 when the device 2 is duly assembled thus supporting and holding the two ends of the two Bowden sleeves in defined positions at the bracket 3.

For connecting the two wire end bodies 40, 41 of the core wire 42 to the check arm 21 each end of the Bowden cable 4 includes a fastening member 61, 62. From the respective supporting region 311, 312 and thus a respective support element 43, 44 the associated end of the core wire 42 extends to a respective fastening element 61, 62 to which a wire end body 40, 41 is attached. Each fastening member 61, 62 comprises a body with a mounting receptacle 610, 620 for positively fitting the respective wire end body 40, 41 to the fastening member 61 or 62. Via the mounting receptacle 610 or 620 a wire end body 40 or 41 is held at the fastening member 61 or 62 in a positive fitting manner so that a fastening member 61 or 62 may transfer the pulling force when the core wire 42 is moved relative to the Bowden sleeves by means of the cable from of the motor drive unit 5. For connecting the core wire 42 to the check arm 21 each fastening member 61, 62 comprises a hook-shaped fastening portion 611, 622. Each hook-shaped fastening portion 611, 622 of a fastening member 61, 62 engages a connection element in the form of a connection pin 212a, 212b provided at the end 211 of the check arm 21. A hook-shaped fastening portion 611 or 621 may for example be clipped to such a connection pin 212a, 212b of the check arm 21.

The connection pins 212a, 212b may be integrally formed with the check arm 21. Alternatively, a connection pin 212a, 212b may be a separate component fixed to the end 212 of the check arm 21, e.g., by press-fitting. In one embodiment both connection pins 212a, 212b projecting perpendicular from the end 212 of the check arm 21 (in opposite directions) may be part of a single connection shaft press-fitted into a through hole at the end 212 of the check arm 21.

One of the two connection pins 212a, 212b which projects upwardly when the device 2 is duly mounted to the vehicle 1 not only provides for a connection between the Bowden cable 4 and the check arm 21 but also provides for a guiding of the check arm 21 along an adjustment path defined by the guiding element 31 of the bracket 3. For this purpose the (upper) connection pin 212a engages into an elongated guiding slot 310 of the guiding element 31. A first portion of this upper connection pin 212a thus reaches through the guiding slot 310 so that it projects from an upper surface of the guiding element 31. A lower, second portion of the connection pin 212a projects from an opposite, lower side of the guiding element 31 bordering its channel 31 a. The first upper portion of the (upper) connection pin 212a extending through the guiding slot 310 is connected to the Bowden cable 4 whereas the second lower portion of this connection pin 212a is connected to the check arm 21.

The connection pin 212a engaging the guiding slot 310 of the guiding element 31 allows for sliding the connection pin 212a along the guiding slot 310 upon opening and closing the vehicle door 11. The connection pin 212a and the guiding slot 310 provide for a side-to-side support for the check arm 21 at the same time allowing the check arm 21 to slide along the length of the bracket 3 and hence allowing the check arm 21 to open and close the vehicle door 11.

As stated above, each of the wire end bodies 40, 41 may apply a pulling force to the check arm 21 so that the check arm 21 may be pulled in two opposite directions along the guiding element 31. In case of the end of the core wire 42 connected to the lower connection pin 212b for pulling the check arm 21 towards the fastening element 30 and thus for moving the vehicle door 11 to a closed position, the core wire 42 is deflected about 180° at the bracket 3. The core wire 42 is guided here from the support element 44 towards the lower connection pin 212b. For this reason a deflection element in the form of pulley 32 is provided at the bracket 3. The pulley 32 is rotatably mounted at a pulley supporting region 313 of the bracket 3. The pulley supporting region 313 is integrally formed with the guiding element 31 and projects below the channel 31a. The pulley supporting region 313 also integrates the support region 312 with the pair of supporting studs 312.1, 312.2.

FIGS. 3A to 3C illustrate the movement of the check arm 21 relative to the bracket 3 driven by the traction mechanism of the device 2 for opening the vehicle door 11 from a fully closed position to a fully opened position. In the starting position shown in FIG. 3A corresponding to the fully closed position of the vehicle door 11 the end 211 of the check arm 21 is located at the end of the guiding slot 310 distant from the fastening element 30. For opening the vehicle door 11 the motor drive unit 5 displaces the core wire 42 relative to the Bowden sleeves of the Bowden cable 4 and pulls the wire end body 41 fitted to the fastening member 62 towards the fastening element 30 of the bracket 3. Due to the connection of the fastening member 62 to the lower connection pin 212b of the check arm 21 the check arm 21 is thereby pulled along an adjustment direction R relative to the bracket 3. The movement of the check arm 21 due to the pulling force applied by the Bowden cable 4 is guided along the guiding element 31 by the other, upper connection pin 212a engaging into the guiding slot 310. In an end position shown in FIG. 3D corresponding to the fully opened position of the vehicle door 11 the end 211 of the check arm 21 has been pulled to the end of the guiding slot 310 so that the fastening members 61 and 62 are located near the fastening element 30. The movement of the check arm 21 relative to the bracket 3 results in a displacement of the end 212 of the check arm 21 relative to the bracket 3. In a mounted state of the device 2 in the vehicle 1 this results in a displacement of the vehicle door 11 comprising the bracket 3 relative to the end 210 of the check arm 21 at which the check arm 21 is hinged to the body structure 10 of the vehicle 1. The pulling the check arm 21 along the bracket 3 by means of the Bowden cable 4 therefore results in a swivel movement of the vehicle door 11 along the opening direction O relative to the body structure 10 when the device 2 is mounted to the vehicle 1. For closing the vehicle door 11 by the motor drive unit 5 a pulling force is applied by the Bowden cable 4 via the upper connection pin 212a engaging into the guiding slot 310. Thereby, the end 211 of the check arm 21 is pulled towards the end of the guiding slot 310 distant from the fastening element 30.

Given that the vehicle door 11 is hinged to the body structure 10 at the door hinge 111 spaced from the articulated joint 20 of the check arm 21, the longitudinal movement of the check arm 21 relative to the bracket 3 along the guiding slot 310 is superimposed with a swivel movement of the check arm 21 about a bearing pin 7 for the articulated joint 20 at the body structure 10. A corresponding swivel movement is indicated by the direction S in FIGS. 3B and 3C. For allowing for a relatively small bracket opening 300 through which the check arm 21 reaches into the channel 31a and thus into the door interior 110 notwithstanding this swivel movement of the check arm 21 the check arm 21 has a curved shape. Due to this curved shape the end 210 of the check arm 21 to be hinged to the body structure 10 is angled away by an angle α (e.g., about 10° to 20°) from an averaged centerline of the check arm 21 as shown in FIG. 2D.

As it is apparent from the above description and the structure of the device 2 the device 2 still allows for a manual operation of the vehicle door 11. When manually pushing or pulling the vehicle door 11 the Bowden cable 4, namely its core wire 42, will just be pulled towards one of the two directions. The motor drive unit 5 no being designed self-locking such manual displacement of the vehicle door 11 is also not blocked by the motor drive unit 5 without any need to operate the motor drive unit 5.

Figure 5:
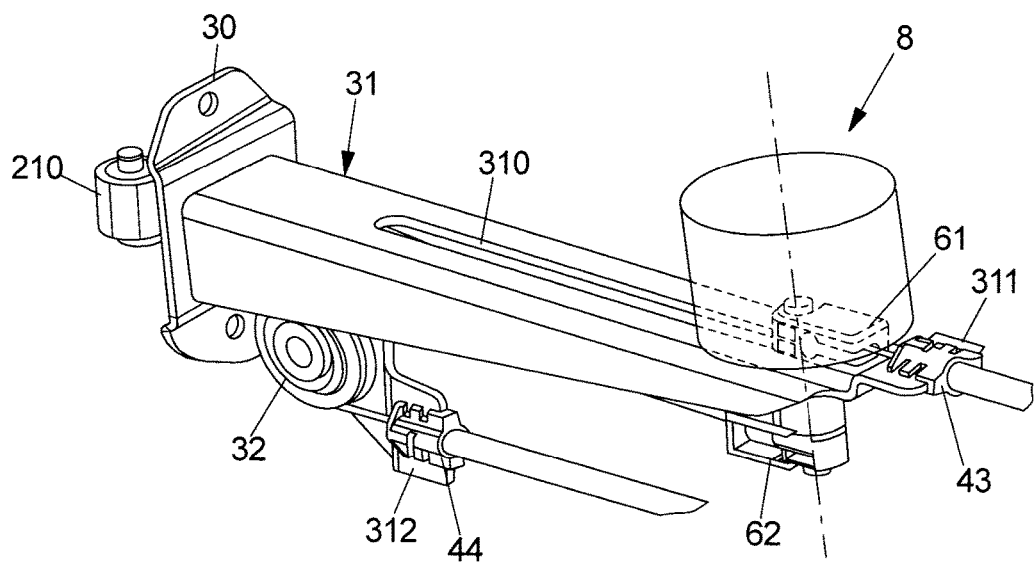
FIG. 5 is an perspective view of a second embodiment of the device including a brake mechanism.

For locking the vehicle door 11, in particular in a partially or fully opened position relative to the body structure 10 a breaking unit 8 with a braking mechanism may be provided as shown in FIG. 5 for a second embodiment of the device 2. The braking mechanism of the brake unit 8 allows for locking the fastening element 61 (and thus the connection pin 212a of the check arm 21 connected to it) with the bracket 3. By thereby blocking a movement of the check arm 21 (fastened to the body structure 10) and the bracket 3 (fastened to the vehicle door 11) a displacement of the vehicle door 11 relative to the body structure 10 may be blocked and the vehicle door 11 may be locked in position relative to the body structure 10.

The braking mechanism of the break unit 8 may be switched from (a) an unlocked state in which the connection pin 212a with the fastening member 61 connected to it is free to move along the guiding slot 310 and (b) a locking state in which such movement is blocked by the brake mechanism. The break unit 8 may be operated either mechanically or electrically, any may thus, for example, in the last case also include an electrically driven actuator.

By locating the breaking unit 8 at the bracket 3 space in the door interior 110 may be effectively used for housing components of the device 2. Furthermore, the braking mechanism may be completely decoupled mechanically from the motor drive unit 5. The motor drive unit 5 may be more or less freely placed within the door interior 110 spaced from the bracket 3 and the break unit 8.

In one embodiment the break unit 8 also includes or is coupled with a sensor device which detects movement of the check arm 21 relative to the bracket 3 and thus directly measures an adjustment of the vehicle door 11 eliminating any effect of play or slack on the measurement.

The foregoing description of the embodiments has been provided for purposes of illustration and description. It is not intended to limit the disclosure. Individual elements or features of a particular embodiment are generally not limited to that particular embodiment, but, where applicable, are interchangeable and can be implemented in another embodiment, even if not specifically shown or described. The same elements may also be varied in one or more ways. Such variations are not to be regarded as a departure from the disclosure, and all such modifications are intended to be included within the scope of the disclosure.

What is claimed is:

1. A device for a motor-driven adjustment of a vehicle door, the device comprising:
   a bracket configured to be fastened to the vehicle door, the bracket comprising a guiding element;
   a check arm configured to be fastened to a body structure of a vehicle at which the vehicle door is adjustably mounted, the check arm being movable relative to the bracket and being guided at the guiding element along an adjustment path, wherein the guiding element comprises a guiding slot defining the adjustment path for the check arm; and
   a traction mechanism configured to be mounted to the vehicle door and comprising a motor drive unit and at least one flexible traction member, the at least one flexible traction member being connected to the check arm and the motor drive unit, and the motor drive unit being configured to drive the at least one flexible traction member for pulling the check arm, by the at least one flexible traction member, along the adjustment path for adjusting the vehicle door relative to the body structure.

2. The device of claim 1, wherein the bracket comprises a channel for accommodating the check arm.

3. The device of claim 1, wherein the check arm comprises at least one connection element.

4. The device of claim 3, wherein the at least one connection element connects the at least one flexible traction member to the check arm.

5. The device of claim 4, wherein the at least one connection element comprises a first portion connected to the check arm and a second portion connected to the at least one flexible traction member.

6. The device of claim 1, wherein the at least one flexible traction member comprises at least one fastening member for connecting the at least one flexible traction member to the check arm.

7. The device of claim 6, wherein the least one fastening member comprises a hook-shaped fastening portion connecting the at least one flexible traction member to the check arm.

8. The device of claim 1, wherein the at least one flexible traction member comprises a Bowden cable.

9. The device of claim 8, the at least one flexible traction member further comprising a fastening member, wherein a core wire of the Bowden cable is attached to the fastening member to connect the at least one flexible traction member to the check arm.

10. The device of claim 1, wherein the at least one flexible traction member comprises at least one support element abutting on the bracket.

11. The device of claim 10, wherein the bracket comprises at least one supporting region for the least one support element of the at least one flexible traction member, the at least one support element being connected to the least one supporting region by a positive connection.

12. The device of claim 1, wherein the check arm comprises a curved shape.

13. A device for a motor-driven adjustment of a vehicle door, the device comprising:
   a bracket configured to be fastened to the vehicle door, the bracket comprising a guiding element;
   a check arm configured to be fastened to a body structure of a vehicle at which the vehicle door is adjustably mounted, the check arm being movable relative to the bracket and being guided at the guiding element along an adjustment path;
   a traction mechanism configured to be mounted to the vehicle door and comprising a motor drive unit and at least one flexible traction member, the at least one flexible traction member being connected to the check arm and the motor drive unit, and the motor drive unit being configured to drive the at least one flexible traction member for pulling the check arm, by the at least one flexible traction member, along the adjustment path for adjusting the vehicle door relative to the body structure; and
   at least one deflection element at the bracket for guiding the at least one flexible traction member from a first direction to a different second direction.

14. The device of claim 13, wherein the at least one deflection element guides the at least one flexible traction member from the motor drive unit towards a connection element of the check arm at which the at least one flexible traction member is connected to the check arm.

15. The device of claim 13, wherein the at least one deflection element comprises a pulley which is rotatably mounted to the bracket.

16. A device for a motor-driven adjustment of a vehicle door, the device comprising:
   a bracket configured to be fastened to the vehicle door, the bracket comprising a guiding element;
   a check arm configured to be fastened to a body structure of a vehicle at which the vehicle door is adjustably mounted, the check arm being movable relative to the bracket and being guided at the guiding element along an adjustment path;
   a traction mechanism configured to be mounted to the vehicle door and comprising a motor drive unit and at least one flexible traction member, the at least one flexible traction member being connected to the check arm and the motor drive unit, and the motor drive unit being configured to drive the at least one flexible traction member for pulling the check arm, by the at least one flexible traction member, along the adjustment path for adjusting the vehicle door relative to the body structure; and
   a brake mechanism located at the bracket and being switchable between an unlocked state and a locking state, and wherein the brake mechanism is configured to, in the unlocked state, allow the check arm to be moved relative to the bracket and, in the locking state, lock a connection element of the check arm, which connects the at least one flexible traction member to the check arm, in a position relative to the bracket so that the check arm is not movable relative to the bracket.

17. A device for a motor-driven adjustment of a vehicle door, the device comprising:
   a bracket configured to be fastened to the vehicle door, the bracket comprising a guiding element;
   a check arm configured to be fastened to a body structure of a vehicle at which the vehicle door is adjustably mounted, the check arm being movable relative to the bracket and being guided at the guiding element along an adjustment path;
   a traction mechanism configured to be mounted to the vehicle door and comprising a motor drive unit and at least one flexible traction member, the at least one flexible traction member being connected to the check arm and the motor drive unit, and the motor drive unit being configured to drive the at least one flexible traction member for pulling the check arm, by the at least one flexible traction member, along the adjustment path for adjusting the vehicle door relative to the body structure;

wherein the check arm comprises at least one connection element; and wherein the at least one connection element engages into a guiding slot of the guiding element.

18. The device of claim 17, wherein the at least one connection element reaches through the guiding slot so that a first portion of the at least one connection element projects from a first side of the guiding element and a second portion of the at least one connection element projects from a second side of the guiding element, the first and second sides being connected by the guiding slot and facing away from each other.

19. A device for a motor-driven adjustment of a vehicle door, the device comprising:

a bracket configured to be fastened to the vehicle door, the bracket comprising a guiding element;

a check arm configured to be fastened to a body structure of a vehicle at which the vehicle door is adjustably mounted, the check arm being movable relative to the bracket and being guided at the guiding element along an adjustment path;

a traction mechanism configured to be mounted to the vehicle door and comprising a motor drive unit and at least one flexible traction member, the at least one flexible traction member being connected to the check arm and the motor drive unit, and the motor drive unit being configured to drive the at least one flexible traction member for pulling the check arm, by the at least one flexible traction member, along the adjustment path for adjusting the vehicle door relative to the body structure;

wherein the at least one flexible traction member comprises at least one support element abutting on the bracket;

wherein the bracket comprises at least one supporting region for the at least one support element of the at least one flexible traction member, the at least one support element being connected to the at least one supporting region by a positive connection; and wherein the at least one supporting region comprises at least one elongated stud engaging into a slot of the at least one support element thereby forming the positive connection.

* * * * *